United States Patent
Fu

(10) Patent No.: US 7,969,637 B1
(45) Date of Patent: Jun. 28, 2011

(54) MEMS MIRROR DRIVEN BY ONE MOTION WITH OSCILLATIONS OF DIFFERENT FREQUENCY FOR BIDIRECTIONAL ROTATION

(75) Inventor: Yee-Chung Fu, Fremont, CA (US)

(73) Assignee: Advanced NuMicro Systems, Inc., San Jose, CA (US)

(*) Notice: Subject to any disclaimer, the term of this patent is extended or adjusted under 35 U.S.C. 154(b) by 518 days.

(21) Appl. No.: 12/164,358

(22) Filed: Jun. 30, 2008

(51) Int. Cl.
*G02B 26/08* (2006.01)

(52) U.S. Cl. .................................... 359/224.1

(58) Field of Classification Search .... 359/223.1–226.1, 359/290, 291, 871, 872
See application file for complete search history.

(56) References Cited

U.S. PATENT DOCUMENTS

| | | | |
|---|---|---|---|
| 6,533,947 B2 | 3/2003 | Nasiri et al. | |
| 7,224,507 B2 * | 5/2007 | Kamiya et al. | 359/224.1 |

* cited by examiner

*Primary Examiner* — Euncha P Cherry
(74) *Attorney, Agent, or Firm* — Patent Law Group LLP; David C. Hsia

(57) ABSTRACT

A micro-electro-mechanical system (MEMS) mirror system has an actuator that imparts a motion with a first periodic movement of high frequency superimposed a second periodic movement of low frequency to a frame and a mirror coupled to the frame so that the mirror rotates about two axes. The mirror is coupled by springs to the frame so the mirror is rotatable about a first axis. The frame has pivots each coupled by springs to actuators so the frame is rotatable about a second axis. The mirror has a first resonant frequency and the frame including the mirror has a second resonant frequency. The low frequency of the second periodic movement is equal to one of the first and the second resonant frequencies, and the high frequency of the first periodic movement is equal to the other one of the first and the second resonant frequencies.

24 Claims, 4 Drawing Sheets

MEMS MIRROR DRIVEN BY ONE MOTION WITH OSCILLATIONS OF DIFFERENT FREQUENCY FOR BIDIRECTIONAL ROTATION

FIELD OF INVENTION

This invention relates to micro-electro-mechanical system (MEMS) devices, and more particularly to MEMS scanning mirrors.

DESCRIPTION OF RELATED ART

U.S. Pat. Nos. 6,769,616 and 7,034,370 disclose a bidirectional scanning MEMS mirror system. In the system, a mirror is rotatably coupled to a frame and the frame is rotatably mounted to an anchor layer. Actuators that consist of electrodes extending from the outer perimeter mirror and the inner perimeter of the frame rotate the mirror about a first axis. Actuators that consist of electrodes extending from the outer perimeter of the frame and the inner perimeter of stationary pads rotate the frame about a second axis. The result is a rather complicated design of the mirror and the frame that allows for rotation and electrical isolation of the voltages necessary to rotate the mirror about the first axis. Thus, what is needed is a simplified design for a bidirectional scanning MEMS mirror systems.

SUMMARY

In embodiments of the invention, a MEMS mirror system has an actuator that imparts a motion with a first periodic movement of high frequency superimposed a second periodic movement of low frequency to a frame and a mirror coupled to the frame so that the mirror rotates about two axes. This allows one or more actuators to be coupled to a frame around the mirror and not the mirror itself, thereby simplifying the design of the MEMS mirror system.

The mirror is coupled by springs to the frame so the mirror is rotatable about a first axis. The frame has pivots each coupled by springs to actuators so the frame is rotatable about a second axis. The mirror has a first resonant frequency and the frame including the mirror has a second resonant frequency. The low frequency of the second periodic movement is equal to one of the first and the second resonant frequencies, and the high frequency of the first periodic movement is equal to the other one of the first and the second resonant frequencies.

BRIEF DESCRIPTION OF THE DRAWINGS

Use of the same reference numbers in different figures indicates similar or identical elements.

DETAILED DESCRIPTION OF THE INVENTION

Figure 1:
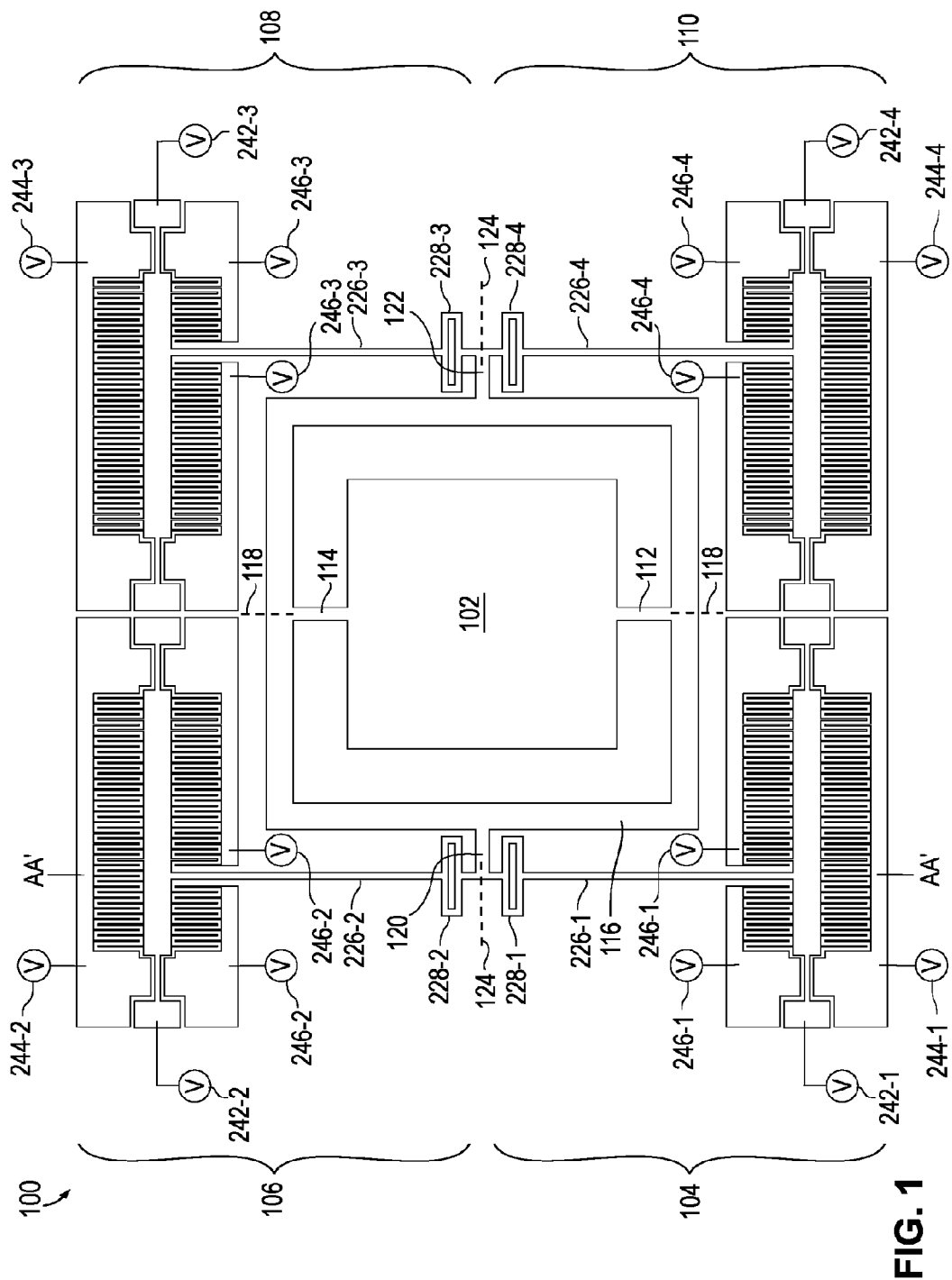
FIG. 1 is a plan view of bidirectional MEMS mirror system in one embodiment of the invention.

FIG. 1 illustrates a micro-electro-mechanical system (MEMS) mirror system 100 in one embodiment of the invention. System 100 is typically made from a silicon substrate using conventional semiconductor processing methods (e.g., masking and etching). System 100 can be used in any application that requires one or two axes of motion (e.g., a unidirectional or a bidirectional scanning mirror).

System 100 includes a mirror 102 rotated by actuators 104, 106, 108, and 110. Mirror 102 is connected by mirror springs 112 and 114 to a frame 116 so the mirror rotates substantially about a rotational axis 118. Frame 116 has a pivot 120 connected to opposing actuator springs 228-1 and 228-2, and a pivot 122 connected to opposing actuator springs 228-3 and 228-4. Spring 228-1, 228-2, 228-3, and 228-4 are respectively coupled to actuators 104,106, 108, and 110. Through this arrangement, actuators 104,106, 108, and 110 are able to rotate frame 116 including mirror 102 to rotate substantially about axis 118 and a rotational axis 124 orthogonal to axis 118.

Figure 2:
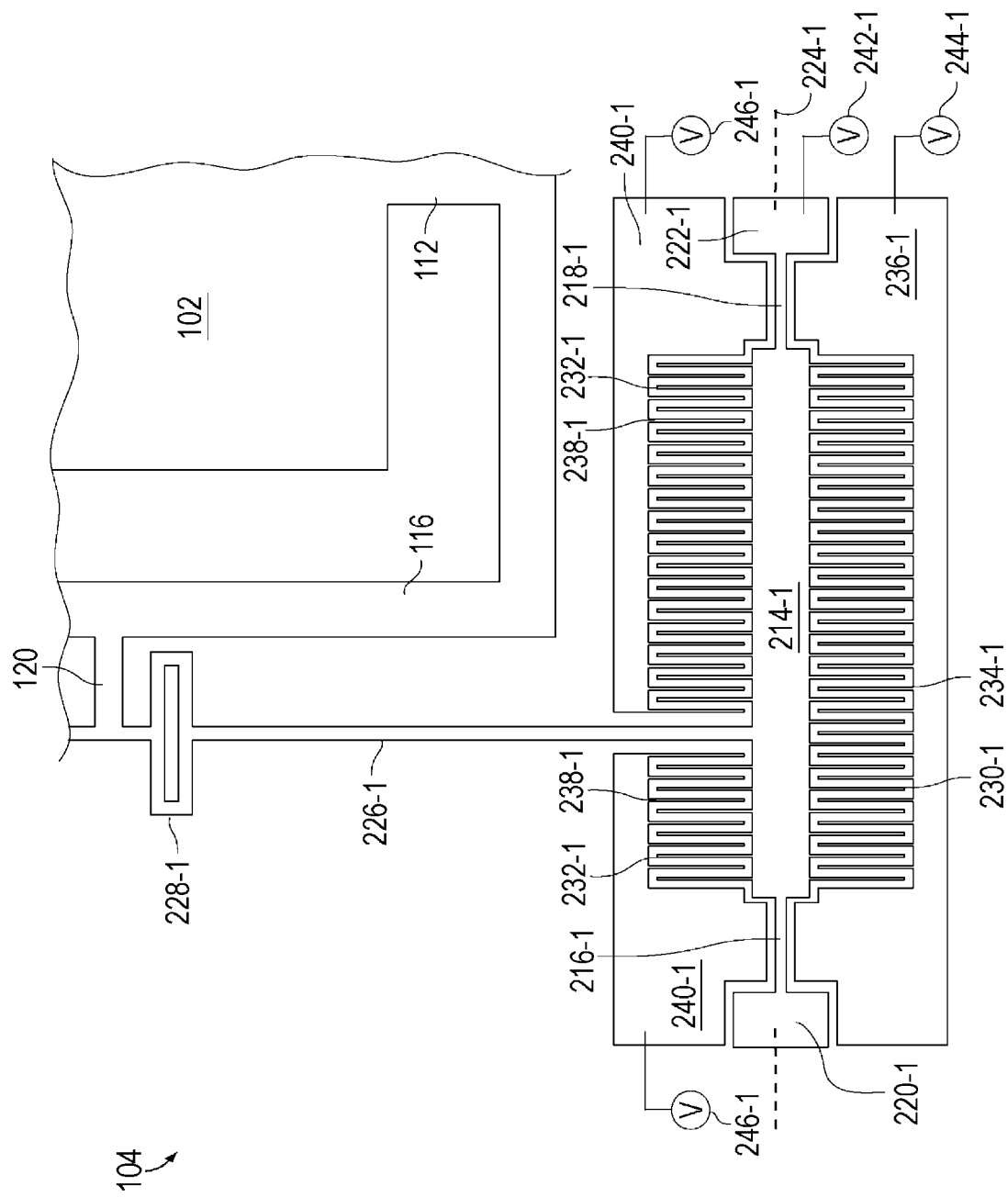
FIG. 2 is an enlarged view of a portion of the plan view of the MEMS mirror system of FIG. 1 in one embodiment of the invention.

FIG. 2 illustrates actuator 104 in greater detail in one embodiment of the invention. Actuator 104 includes a generally rectangular body 214-1 coupled by springs 216-1 and 218-1 to stationary pads 220-1 and 222-1, respectively, so the body rotates substantially about a rotational axis 224-1. Axis 224-1 is substantially parallel to axis 124 (FIG. 1) of frame 116. An actuator arm 226-1 extends from body 214-1 and is coupled by spring 228-1 to pivot 120 of frame 116. Spring 228-1 provides an elastic coupling between actuator arm 226-1 and pivot 120 of frame 116 so the rotation of actuator the arm and body 214-1 can be transferred and amplified to the frame and mirror 102.

Rotatable electrodes 230-1 (only a few are labeled for clarity) extend from body 214-1 on one long side along axis 224-1, and rotatable electrodes 232-1 (only a few are labeled for clarity) extend from the body on a parallel long side. Stationary electrodes 234-1 (only a few are labeled for clarity) extend from a stationary pad 236-1 in a layer below to be interdigitated out of plane with rotatable electrodes 230-1. Stationary electrodes 238-1 (only a few are labeled for clarity) extend from stationary pads 240-1 in a layer below to be interdigitated out of plane with rotatable electrodes 232-1. Actuator arm 226-1 extends from body 214-1 between stationary pads 240-1 so the actuator arm can freely rotate without hitting the stationary pads.

A voltage source 242-1 is coupled to rotatable electrodes 230-1 and 232-1. A voltage source 244-1 is coupled to stationary electrodes 234-1. A voltage source 246-1 is coupled to stationary electrodes 238-1. Body 214-1 rotates in one direction (e.g., clockwise) when a voltage difference between rotatable electrodes 230-1 and stationary electrodes 234-1 pulls rotatable electrodes 230-1 down towards stationary electrodes 234-1. Similarly, body 214-1 rotates in the opposite direction (e.g., counterclockwise) when the voltage difference between rotatable electrodes 232-1 and stationary electrodes 238-1 pulls rotatable electrodes 232-1 down toward stationary electrodes 238-1. Body 214-1 oscillates when stationary electrodes 234-1 and 238-1 pull respective rotatable electrodes 230-1 and 232-1 down in an alternating fashion. To do so, voltage source 242-1 provides a steady voltage while voltage sources 244-1 and 246-1 provide oscillating voltages that are substantially out of phase (e.g., by 180 degrees).

Figure 3:
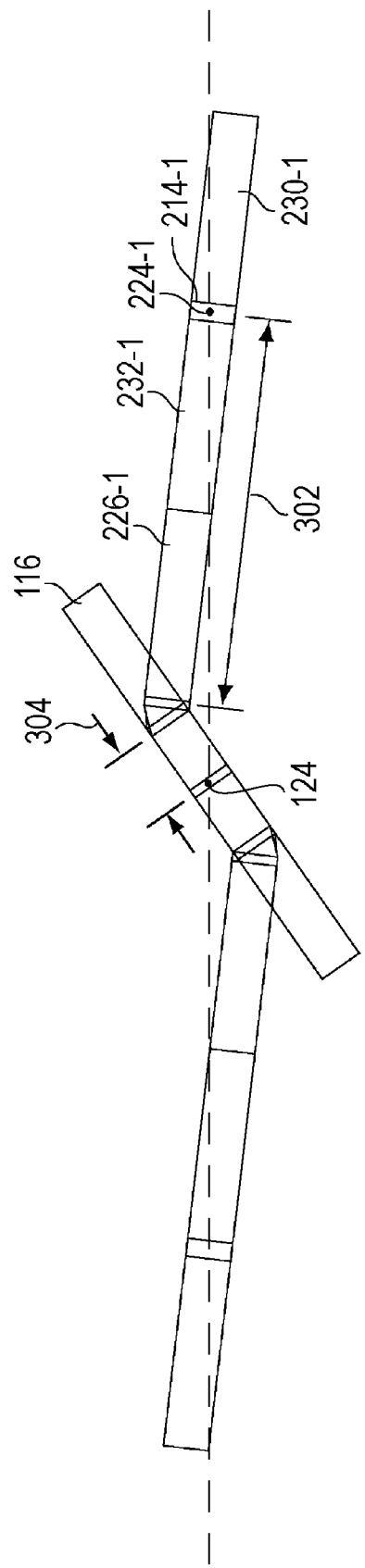
FIG. 3 is a cross-sectional view of the amplified rotation of the mirror in the MEMS mirror system of FIG. 1 in one embodiment of the invention.

Referring to FIG. 3, which shows a simplified cross-section of system 100 along line AA'AA" (FIG. 1), it can be seen that arm 226-1 is coupled to frame 116 close to axis 124. Specifically, a perpendicular distance 302 from axis 224-1 of body 214-1 to the coupling between arm 226-1 and frame 116 is greater than a perpendicular distance 304 from axis 124 of the frame to the coupling between the arm and the frame. This configuration translates a small rotation of body 214-1 and arm 226-1 into a large rotation for frame 116 and mirror 102 (FIG. 1).

Referring back to FIG. 1, actuator 106 is symmetrically opposed to actuator 104 relative to rotational axis 124 of frame 116 but they are located on the same side of rotational axis 118. Actuator 106 has an actuator arm 226-2 coupled by spring 228-2 to pivot 120 of frame 116. Otherwise actuator 106 is similarly constructed like actuator 104 where the similar components are labeled with the same reference numeral with "-2" instead of "-1".

Actuator 108 is symmetrically opposed to actuator 106 relative to rotational axis 118 of mirror 102 but they are located on the same side of rotational axis 124. Actuator 108 has an actuator arm 226-3 coupled by spring 228-3 to pivot 122. Otherwise actuator 108 is similarly constructed like actuator 104 where the similar components are labeled with the same reference numeral with "-3."

Actuator 110 is symmetrically opposed to actuator 108 relative to rotational axis 124 of frame 116 but they are located on the same side of rotational axis 118. Actuator 110 has an actuator arm 226-4 coupled by spring 228-4 to pivot 122. Otherwise actuator 110 is similarly constructed like actuator 104 where the similar components are labeled with the same reference numeral with "-4."

For any pair of actuators to oscillate their arms in the same direction in unison, their corresponding voltages sources should supply the same steady voltage and the same oscillating voltages in phase. For any pair of actuators to oscillate their arms in the opposite directions in unison, their corresponding voltage sources should supply the same steady voltage and the same oscillating voltages out of phase (e.g., by 180 degrees).

To rotate frame 116 about axis 124 in one direction (e.g., counterclockwise in FIG. 3), actuators 104 and 110 rotate their actuator arms in one direction (e.g., up) while actuators 106 and 108 rotate their actuator arms in the opposite direction (e.g., down). The process is reversed to rotate frame 116 about axis 124 in the opposite direction, and the processes are repeated to oscillate the frame about axis 124. The oscillating of frame 116 about axis 124 imparts the same oscillation to mirror 102. To achieve large rotation of frame 116 and mirror 102 about axis 124, one or more of actuators 104, 106, 108, and 110 can oscillate or otherwise periodically excite the frame at one resonant frequency of the frame including the mirror. The resonant frequency is equal to the scanning frequency needed in application of system 100. To achieve this, computer modeling can be used to test various designs of frame 116 including mirror 102.

To rotate frame 116 about axis 118 in one direction, actuators 104 and 106 rotate their actuator arms in one direction (e.g., up) while actuators 108 and 110 rotate their actuator arms in the opposite direction (e.g., down). The process is reversed to rotate frame 116 about axis 118 in the opposite direction, and the processes are repeated to oscillate the frame about axis 118. The oscillation of frame 116 about axis 118 imparts the same oscillation to mirror 102. As frame 116 is elastically coupled to mirror 102 by springs 112 and 114, the rotation of the mirror is amplified. To achieve large rotation of mirror 102 about axis 118, one or more of actuators 104, 106, 108, and 110 can oscillate or otherwise periodically excite the mirror at one resonant frequency of the mirror. The resonant frequency is equal to the scanning frequency needed in application of system 100. To achieve this, computer modeling can be used to test various designs mirror 102.

In one embodiment, the resonant frequency of mirror 102 about axis 118 is a magnitude of order different than the resonant frequency frame 116 including the mirror about axis 124. For example, mirror 102 has a resonant frequency of 20 kHz, and frame 116 including the mirror has a resonant frequency of 100 Hz. This allows an actuator to oscillate mirror 102 simultaneously about axes 118 and 124 by imparting a motion consisting of a first periodic movement (e.g., a small oscillating movement) at the higher resonant frequency superimposed on a second periodic movement (e.g., a large oscillating movement) at the lower resonant frequency. Specifically, an actuator arm would have a motion including a larger but slower oscillating movement that rotates frame 116 and mirror 102 about axis 124. Along the path of the larger but slower oscillating movement, the motion further includes a smaller but faster oscillating movement that rotates frame 116 and mirror 102 about axis 118. Even though a smaller oscillating movement is used to rotate frame 116 and mirror 102 about axis 118, the resulting oscillation of the mirror can be large as it is amplified through the elastic coupling at springs 112 and 114 between the frame and the mirror.

For actuators 104, 106, 108, and 110 to work together to oscillate mirror 102 about axes 118 and 124, the large and small oscillating movements of each actuator must have the appropriate phase offsets relative to the other actuators. To oscillate mirror 102 about axis 124, the large oscillating movements of actuators 104 and 110 are in phase while the large oscillating movements of actuators 106 and 108 are in phase but out of phase with actuators 104 and 110. To oscillate mirror 102 about axis 118, the small oscillating movements of actuators 104 and 106 are in phase while the small oscillating movements of actuators 108 and 110 are in phase but out of phase with actuators 104 and 106.

The following tables list exemplary actuator motions to oscillate mirror 102 about axes 118 and 124. Movement M1 is the larger oscillating movement, movement M2 is the smaller oscillating movement, movement M3 is a compliment of M1 with a phase offset (e.g., 180 degree offset), and movement M4 is a complement of M2 a with phase offset (e.g., 180 degree offset). It is noted that in practice the larger and smaller oscillating movements at each actuator may be slightly different.

TABLE 1

| Actuator | Movements |
| --- | --- |
| 104 | M1 + M2 |
| 106 | M3 + M2 |
| 108 | M3 + M4 |
| 110 | M1 + M4 |

The following tables list exemplary voltages for causing appropriate actuator motions to oscillate mirror 102 about axes 118 and 124. Signal V1 is a larger oscillating signal (e.g., a sine or square wave) that causes a larger oscillating movement, signal V2 is a smaller oscillating signal (e.g., a sine or square wave) that causes a smaller oscillating movement, signal V3 is a compliment of signal V1 with a phase offset (e.g., 180 degree offset), and signal V4 is a complement of signal V2 with a phase offset (e.g., 180 degree offset).

TABLE 2

| Voltage source | Signals (V) |
| --- | --- |
| 242-1 | Steady |
| 244-1 | V1 + V2 |
| 246-1 | V3 + V4 |
| 242-2 | Steady |

TABLE 2-continued

| Voltage source | Signals (V) |
|---|---|
| 244-2 | V3 + V2 |
| 246-2 | V1 + V4 |
| 242-3 | Steady |
| 244-3 | V3 + V4 |
| 246-3 | V1 + V2 |
| 242-4 | Steady |
| 244-4 | V1 + V4 |
| 246-4 | V3 + V2 |

Figure 4:
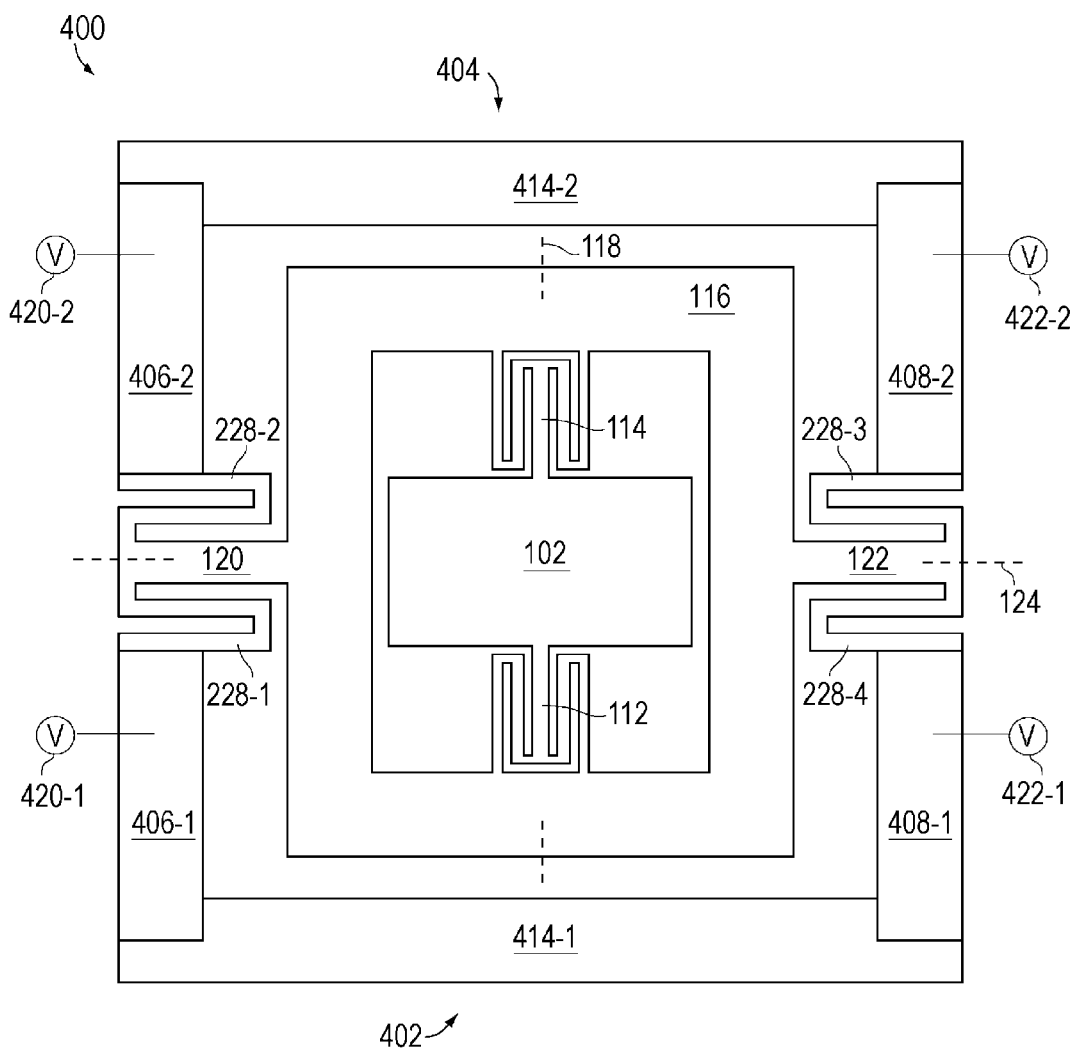
FIG. 4 is a plan view of bidirectional MEMS mirror system in another embodiment of the invention.

FIG. 4 illustrates a micro-electro-mechanical system (MEMS) mirror system 400 in one embodiment of the invention. While system 100 described above is electrostatic, system 400 is piezoelectric. Like system 100, system 400 is typically made from a silicon substrate using conventional semiconductor processing methods, and system 400 can be used in any application that requires one or two axes of motion.

Mirror 102 is connected by mirror springs 112 and 114 to frame 116 so the mirror rotates substantially about rotational axis 118. Frame 116 has pivot 120 connected to opposing actuator springs 228-1 and 228-2, and pivot 122 connected to opposing actuator springs 228-3 and 228-4. Spring 228-1 and 228-4 are coupled to arms 406-1 and 408-1 of actuator 402, respectively. Springs 228-2 and 228-3 are coupled to arms 406-2 and 408-2 of actuator 404, respectively. Through this arrangement, actuators 404 and 402 are able to rotate frame 116 including mirror 102 substantially about axis 118 and rotational axis 124 orthogonal to axis 118.

Actuator 402 includes a stationary body 414-1 with arms 406-1 and 408-1 extending from the ends of the stationary body. A piezoelectric film stack is applied (e.g., deposited) on arms 406-1 and 408-1 so they form piezoelectric actuator arms that pivot about a direction parallel to axis 124 when voltage is applied. The bottom layer of the piezoelectric film stack is a protective insulating film that insulates the stack from the structure below. Voltage sources 420-1 and 422-1 are coupled to arms 406-1 and 408-1, respectively.

Actuator 404 is symmetrically opposed to actuator 402 relative to rotational axis 124 of frame 116. Actuator 404 includes a stationary body 414-2 with arms 406-2 and 408-2 extending from the ends of the stationary body. The piezoelectric film stack described above is also applied on arms 406-2 and 408-2 so they form piezoelectric actuator arms that pivot about a direction parallel to axis 124 when voltage is applied. Voltage sources 420-2 and 422-2 are coupled to arms 406-2 and 408-2, respectively.

For any pair of piezoelectric actuator arms to oscillate in the same direction in unison, their corresponding voltage sources should supply the same oscillating voltages in phase. For any pair of piezoelectric actuator arms to oscillate in the opposite directions in unison, their corresponding voltage sources should supply the same oscillating voltages out of phase (e.g., by 180 degrees).

To rotate frame 116 about axis 124 in one direction, arms 406-1 and 408-1 of actuator 402 pivots in one direction (e.g., up) while arms 406-2 and 408-2 of actuator 404 pivots in the opposite direction (e.g., down). The process is reversed to rotate frame 116 about axis 124 in the opposite direction, and the processes are repeated to oscillate frame 116 about axis 124. The oscillation of frame 116 about axis 124 imparts the same oscillation to mirror 102. To achieve large rotation of frame 116 and mirror 102 about axis 124, one or more of actuators 402 and 404 can oscillate or otherwise periodically excite the frame at one resonant frequency of the frame including the mirror. The resonant frequency is equal to the scanning frequency needed in application of system 400. To achieve this, computer modeling can be used to test various designs of frame 116 including mirror 102.

To rotate frame 116 about axis 118 in one direction, arm 406-1 of actuator 402 and arm 406-2 of actuator 404 pivot in one direction (e.g., up) while arm 408-1 of actuator 402 and arm 408-2 of actuator 404 pivot in the opposite direction (e.g., down). The process is reversed to rotate frame 116 about axis 118 in the opposite direction, and the processes are repeated to oscillate the frame about axis 118. The oscillation of frame 116 about axis 118 imparts the same oscillation to mirror 102. As frame 116 is elastically coupled to mirror 102 by springs 112 and 114, the rotation of the mirror is amplified. To achieve large rotation of mirror 102 about axis 118, one or more of actuators 402 and 404 can oscillate or otherwise periodically excite the mirror at one resonant frequency of the mirror. The resonant frequency is equal to the scanning frequency needed in application of system 400. To achieve this, computer modeling can be used to test various designs mirror 102.

In one embodiment, the resonant frequency of mirror 102 about axis 118 is a magnitude of order different than the resonant frequency frame 116 including the mirror about axis 124. For example, mirror 102 has a resonant frequency of 20 kHz, and frame 116 including the mirror has a resonant frequency of 100 Hz. This allows an actuator to oscillate mirror 102 simultaneously about axes 118 and 124 by imparting a motion consisting of a first periodic movement (e.g., a small oscillating movement) at the higher resonant frequency superimposed on a second periodic movement (e.g., a large oscillating movement) at the lower resonant frequency. Specifically, an actuator would have a motion including a larger but slower oscillating movement that rotates frame 116 and mirror 102 about axis 124. Along the path of the larger but slower oscillating movement, the motion further includes a smaller but faster oscillating movement that rotates frame 116 and mirror 102 about axis 118. Even though a smaller oscillating movement is used to rotate frame 116 and mirror 102 about axis 118, the resulting oscillation of the mirror can be large as it is amplified through the elastic coupling at springs 112 and 114 between the frame and the mirror.

For actuators 402 and 404 to work together to oscillate mirror 102 about axes 118 and 124, the large and small oscillating movements of each actuator arm must have the appropriate phase offsets relative to the other actuators. To oscillate mirror 102 about axis 124, the large oscillating movements generated by actuators 402 and 404 are out of phase. To oscillate mirror 102 about axis 118, the small oscillating movements generated by arms 406-1 and 406-2 of actuators 402 and 404, respectively, are in phase while the small oscillating movements generated by arms 408-1 and 408-2 of actuators 402 and 404, respectively, are in phase but out of phase with arms 406-1 and 406-2.

The following tables list exemplary actuator motions to oscillate mirror 102 about axes 118 and 124. Movement m1 is the larger oscillating movement, movement m2 is the smaller oscillating movement, movement m3 is a complement of m2 a with phase offset (e.g., 180 degree offset), and movement m4 is a compliment of m1 with a phase offset (e.g., 180 degree offset). It is noted that in practice the larger and smaller oscillating movements at each actuator may be slightly different.

TABLE 3

| Actuator parts | Movements |
|---|---|
| 406-1 | m1 + m2 |
| 408-1 | m1 + m3 |
| 406-2 | m4 + m2 |
| 408-2 | m4 + m3 |

The following tables list exemplary voltages for causing appropriate actuator motions to oscillate mirror 102 about axes 118 and 124. Signal v1 is a larger oscillating signal (e.g., a sine or square wave) that causes a larger oscillating movement, signal v2 is a smaller oscillating signal (e.g., a sine or square wave) that causes a smaller oscillating movement, and signal v3 is a complement of signal v2 with a phase offset (e.g., 180 degree offset), and signal v4 is a compliment of signal v1 with a phase offset (e.g., 180 degree offset)

TABLE 4

| Voltage source | Signals (V) |
|---|---|
| 420-1 | v1 + v2 |
| 422-1 | v1 + v3 |
| 420-2 | v4 + v2 |
| 422-2 | v4 + v3 |

In embodiments of the invention described above, each actuator can cause rotation of mirror 102 about two axes through its coupling to frame 116. This allows the actuators to be placed away from the mirror and on the perimeter of the system, which in turn simplifies the design of system 100 as mirror 102 and frame 116 are free of electrodes and the associated electrical leads.

Various other adaptations and combinations of features of the embodiments disclosed are within the scope of the invention. In one embodiment, each actuator only has rotatable electrodes on one long side of the actuator body, their corresponding stationary electrodes, and voltage sources. In another embodiment, only a single actuator is used to oscillate mirror 102 about axes 118 and 124. Furthermore, any combination of the above embodiments can also be implemented. Numerous embodiments are encompassed by the following claims.

The invention claimed is:

1. A method to oscillate a micro-electro-mechanical system (MEMS) mirror system comprising (1) a mirror coupled to a frame and (2) a first actuator elastically coupled to the frame to oscillate the mirror, the mirror being rotatable about a first axis, the mirror having a first resonant frequency for oscillating about the first axis, the frame being rotatable about a second axis, the frame including the mirror having a second resonant frequency for oscillating about the second axis, the method comprising:
   causing the first actuator to impart a first motion to the frame, the first motion comprising (1) a first periodic movement with a first amplitude and a first frequency, and (2) a second periodic movement with a second amplitude and a second frequency superimposed on the first periodic movement, the second frequency being greater than the first frequency by at least one order of magnitude, the first frequency being equal to one the first and the second resonant frequencies, and the second frequency being equal to the other one of the first and the second resonant frequencies.

2. The method of claim 1, further comprising a second actuator coupled to the frame, the method further comprises:
   causing the second actuator to impart a second motion to the frame, the second motion comprising (1) a third periodic movement with the first amplitude and the first frequency, and (2) the second periodic movement superimposed on the third periodic movement, the first and the third periodic movements being out of phase.

3. The method of claim 2, further comprising third and fourth actuators coupled to the frame, the method further comprises:
   causing the third actuator to impart a third motion to the frame, the third motion comprising (1) the third periodic movement and (2) a fourth periodic movement with the second amplitude and the second frequency superimposed on the third periodic movement, the second and the fourth periodic movements being out of phase; and
   causing the fourth actuator to impart a fourth motion to the frame, the fourth motion comprising (1) the first periodic movement and (2) the fourth periodic movement superimposed on the first periodic movement.

4. The method of claim 3, wherein:
   the first and the second actuators are located on one side of the first axis, and the third and the fourth actuators are located on the other side of the first axis;
   the first and the fourth actuators are located on one side of the second axis, and the second and the third actuators are located on the other side of the second axis;
   the first and the second actuators are coupled by springs to a first pivot extending from a first side of the frame; and
   the third and the fourth actuators are coupled by springs to a second pivot extending from a second side of the frame.

5. The method of claim 4, wherein said causing the first, the second, the third, and the fourth actuators to impart the first, the second, the third, and the fourth motions comprises:
   providing a first control signal to the first actuator, the first control signal comprising (1) a first oscillating signal with a first signal amplitude and the first frequency, and (2) a second oscillating signal with a second signal amplitude and the second frequency superimposed on the first oscillating signal;
   providing a second control signal to the second actuator, the second control signal comprising (1) a third oscillating signal with the first signal amplitude and the first frequency, and (2) the second oscillating signal superimposed on the third oscillating signal, the first and the third oscillating signals being out of phase;
   providing a third control signal to the third actuator, the third control signal comprising (1) the third oscillating signal and (2) a fourth oscillating signal with the second signal amplitude and the second frequency superimposed on the third oscillating signal, the second and the fourth oscillating signals being out of phase;
   providing a fourth control signal to the fourth actuator, the fourth control signal comprising (1) the first oscillating signal and (2) the fourth oscillating signal superimposed on the first oscillating signal; and
   providing a reference signal to the first, the second, the third, and the fourth actuator.

6. The method of claim 5, wherein each actuator comprises:
   a body connected by springs to first stationary pads so the body is rotatable about a third axis substantially parallell to the second axis;
   rotating electrodes extending from the body and coupled to one of a respective control signal and the reference signal; and stationary electrodes extending from second stationary pads, the stationary electrodes being interdigitated in plane or out of plane with the rotating electrodes, the stationary electrodes being coupled to the other of the respective control signal and the reference signal.

7. The method of claim 1, further comprising:
causing the first actuator to impart a second motion to the frame, the second motion comprising (1) the first periodic movement and (2) a third periodic movement with the second amplitude and the second frequency superimposed on the first periodic movement, the second and the third periodic movements being out of phase.

8. The method of claim 7, wherein the system further comprises a second actuator coupled to the frame, the method further comprises:
causing the second actuator to impart:
a third motion to the frame, the third motion comprising (1) a fourth periodic movement with the first amplitude and the first frequency, and (2) the second periodic movement superimposed on the fourth periodic movement, the first and the fourth periodic movements being out of phase; and
a fourth motion to the frame, the fourth motion comprising (1) the fourth periodic movement and (2) the third periodic movement superimposed on the fourth periodic movement.

9. The method of claim 8, wherein:
the first and the second actuators are located on opposite sides of the second axis;
the first actuator has arms coupled by springs to pivots extending from the frame; and
the second actuator has arms coupled by springs to the pivots extending from the frame.

10. The method of claim 9, wherein:
said causing the first actuator to impart the first and the second motions comprises:
providing a first oscillating signal comprising a first signal amplitude and the first frequency;
providing a second oscillating signal comprising a second signal amplitude and the second frequency; and
providing a third oscillating signal comprising the second signal amplitude and the second frequency, the second and the third oscillating signals being out of phase; and
said causing the second actuator to impart the third and the fourth motions comprises:
providing a fourth oscillating signal comprising the first signal amplitude and the first frequency, the first and the fourth oscillating signals being out of phase;
providing the second oscillating signal; and
providing the third oscillating signal.

11. The method of claim 10, wherein:
the first actuator comprises:
a first piezoelectric arm pivotable about a direction substantially parallel to the second axis, the first piezoelectric arm is coupled to receive the first and the second oscillating signals; and
a second piezoelectric arm pivotable about the direction substantially parallel to the second axis, the second piezoelectric arm is coupled to receive the first and the third oscillating signals; and
the second actuator comprises:
a third piezoelectric arm pivotable about the direction substantially parallel to the second axis, the third piezoelectric arm is coupled to receive the fourth and the second oscillating signals; and
a fourth piezoelectric arm pivotable about the direction substantially parallel to the second axis, the fourth piezoelectric arm is coupled to receive the fourth and the third oscillating signals.

12. The method of claim 1, wherein the first amplitude being greater than the second amplitude.

13. A micro-electro-mechanical system (MEMS) mirror system, comprising:
a mirror within a frame, the mirror being coupled by a mirror spring to the frame, the mirror being rotatable about a first axis, the mirror having a first resonant frequency for oscillating about the first axis, the frame being rotatable about a second axis, the frame including the mirror having a second resonant frequency for oscillating about the second axis;
a first actuator comprising a first arm coupled by a first actuator spring to the frame, the first arm configured to cause the mirror to oscillate about the first and the second axes; and
voltage sources coupled to the first actuator, the voltage sources configured to cause the first actuator to move the first arm in a first motion comprising (1) a first periodic movement with a first amplitude and a first frequency, and (2) a second periodic movement with a second amplitude and a second frequency superimposed on the first periodic movement, the second frequency being greater than the first frequency by at least one order of magnitude, the first frequency being equal to one the first and the second resonant frequencies, and the second frequency being equal to the other one of the first and the second resonant frequencies.

14. The system of claim 13, further comprises:
a second actuator comprising a second arm coupled by a second actuator spring to the frame, wherein the voltage sources are coupled to the second actuator to cause the second actuator to move the second arm in a second motion comprising (1) a third periodic movement with the first amplitude and the first frequency and (2) the second periodic movement superimposed on the third periodic movement, the first and the third periodic movements being out of phase.

15. The system of claim 14, further comprising:
a third actuator comprising a third arm coupled by a third actuator spring to the frame, wherein the voltage sources are coupled to the third actuator to cause the third actuator to move the third arm in a third motion comprising (1) the third periodic movement and (2) a fourth periodic movement with the second amplitude and the second frequency superimposed on the third periodic movement, the second and the fourth periodic movements being out of phase;
a fourth actuator comprising a fourth arm coupled by a fourth actuator spring to the frame, wherein the voltage sources are coupled to the fourth actuator to cause the fourth actuator to move the fourth arm in a fourth motion comprising (1) the first periodic movement and (2) the fourth periodic movement superimposed on the first periodic movement.

16. The system of claim 15, wherein:
the first and the second actuators are located on one side of the first axis, and the third and the fourth actuators are located on the other side of the first axis;
the first and the fourth actuators are located on one side of the second axis, and the second and the third actuators are located on the other side of the second axis;

the first and the second arms are coupled by the first and the second actuator springs to a first pivot extending from a first side of the frame on one side of the first axis; and the third and the fourth arms are coupled by the third and the fourth actuator springs to a second pivot extending from a second side of the frame on the other side of the first axis.

17. The system of claim 16, wherein the voltage sources provide:

a first control signal to the first actuator, the first control signal comprising (1) a first oscillating signal with a first signal amplitude and the first frequency, and (2) a second oscillating signal with a second signal amplitude and the second frequency superimposed on the first oscillating signal;

a second control signal to the second actuator, the second control signal comprising (1) a third oscillating signal with the first signal amplitude and the first frequency, and (2) the second oscillating signal superimposed on the third oscillating signal, the first and the third oscillating signals being out of phase;

a third control signal to the third actuator, the third control signal comprising (1) the third oscillating signal and (2) a fourth oscillating signal with the second signal amplitude and the second frequency superimposed on the third oscillating signal, the second and the fourth oscillating signals being out of phase;

a fourth control signal to the fourth actuator, the fourth control signal comprising (1) the first oscillating signal and (2) the fourth oscillating signal superimposed on the first oscillating signal; and a reference signal to the first, the second, the third, and the fourth actuators.

18. The system of claim 17, wherein each actuator comprises:

a body connected by springs to first stationary pads so the body is rotatable about a third axis substantially parallel to the second axis;

rotating electrodes extending from the body and coupled to one of a respective control signal and the reference signal; and stationary electrodes extending from second stationary pads, the stationary electrodes being interdigitated in plane or out of plane with the rotating electrodes, the stationary electrodes being coupled to the other of the respective control signal and the reference signal.

19. The system of claim 13, wherein the first actuator has a second actuator arm coupled by another first actuator spring to the frame and the voltage sources is further configured to cause the first actuator to move the second arm to impart a second motion to the frame, the second motion comprising (1) the first periodic movement and (2) a third periodic movement with the second amplitude and the second frequency superimposed on the first periodic movement, the second and the third periodic movements being out of phase.

20. The system of claim 19, further comprising a second actuator comprising third and fourth arms coupled by second actuator springs to the frame, wherein the voltage sources are further configured to cause the second actuator to move:

the third arm to impart a third motion to the frame, the third motion comprising (1) a fourth periodic movement with the first amplitude and the first frequency and (2) the second periodic movement superimposed on the fourth periodic movement, the first and the fourth periodic movements being out of phase; and the fourth arm to impart a fourth motion to the frame, the fourth motion comprising (1) the fourth periodic movement and (2) the third periodic movement superimposed on the fourth periodic movement.

21. The system of claim 20, wherein:

the first and the second actuators are located on opposite sides of the second axis;

the first and the second arms are coupled by the first actuator springs to pivots extending from the frame; and the third and the fourth arms are coupled by the second actuator springs to the pivots extending from the frame.

22. The system of claim 21, wherein the voltage sources provide:

a first oscillating signal to the first actuator, the first oscillating signal comprising a first signal amplitude and the first frequency;

a second oscillating signal to the first actuator, the second oscillating signal comprising a second signal amplitude and the second frequency;

a third oscillating signal to the first actuator, the third oscillating signal comprising the second signal amplitude and the second frequency, the second and the third oscillating signals being out of phase; and a fourth oscillating signal to the second actuator, the fourth oscillating signal comprising the first signal amplitude and the first frequency, the first and the fourth oscillating signals being out of phase;

the second oscillating signal to the second actuator; and the third oscillating signal to the second actuator.

23. The system of claim 22, wherein:

the first actuator comprises:

a first piezoelectric arm pivotable about a direction substantially parallel to the second axis, the first piezoelectric arm is coupled to receive the first and the second oscillating signals; and a second piezoelectric arm pivotable about the direction substantially parallel to the second axis, the second piezoelectric arm is coupled to receive the first and the third oscillating signals; and the second actuator comprises:

a third piezoelectric arm pivotable about the direction substantially parallel to the second axis, the third piezoelectric arm is coupled to receive the fourth and the second oscillating signals; and a fourth piezoelectric arm pivotable about the direction substantially parallel to the second axis, the fourth piezoelectric arm is coupled to receive the fourth and the third oscillating signals.

24. The system of claim 13, wherein the first amplitude being greater than the second amplitude.

* * * * *